United States Patent [19]
Beukers et al.

[11] 3,781,893
[45] Dec. 25, 1973

[54] ANTENNA FOR WEATHER BALLOON

[76] Inventors: John M. Beukers, 8 Old Wood Rd.;
Martin C. Poppe, 46 Pembrook Dr.,
both of Stoneybrook, N.Y. 11790

[22] Filed: Jan. 31, 1972

[21] Appl. No.: 222,199

Related U.S. Application Data

[63] Continuation-in-part of Ser. No. 873,590, Nov. 3, 1969, abandoned.

[52] U.S. Cl.................. 343/702, 343/706, 343/791
[51] Int. Cl. ............................................. H01q 1/28
[58] Field of Search................. 343/702, 706, 79 D, 343/791, 792, 846

[56] References Cited
UNITED STATES PATENTS 2,462,102  2/1949  Istuan ................................ 343/706
2,184,771  12/1939  Roosenstein ........................ 343/830
3,576,578  4/1971  Harper ............................... 343/791

*Primary Examiner*—Eli Leiberman
*Attorney*—Nichol M. Sandoe et al.

[57] ABSTRACT

Meteorological sensing equipment is carried in an airborne vehicle. Also contained in that vehicle is a navigation receiver which receives tracking signals from a remote station and retransmits those signals, thereby to locate the position of the airborne vehicle. The present invention provides an improved antenna construction for use with the navigation receiver, that antenna comprising a first signal-receiving conductor and a second conductor arranged with respect to the first conductor in a manner defining an artificial ground plane across which the received tracking signal is produced.

3 Claims, 6 Drawing Figures

ANTENNA FOR WEATHER BALLOON

This is a continuation-in-part of application Ser. No. 873,590, filed on Nov. 3, 1969 now abandoned.

The present invention relates to weather-data-gathering systems, and particularly to a system in which the meteorological data-sensing equipment is carried aloft on an air-borne vehicle such as a balloon, and which includes a navigation receiver for providing position information of the balloon.

In recent years, significantly new approaches have been devised to achieve more complete and accurate information on which to base weather predictions. This has involved the acquiring of significant data concerning cloud formations, wind movements and the like, which contribute greatly to a better understanding of weather formations and which in turn enables a more accurate prediction of weather conditions. One of these new approaches has been the use of weather satellites which circle the globe and periodically transmit photographs of cloud formations and make temperature measurements over large areas of the world's surface. While this information is useful in enlarging the understanding of developing weather patterns and possible storms, this information may be characterized as pertaining to the atmosphere above the cloud level. Furthermore, satellites do not at this time provide information relating to wind velocities. Without this additional quantitative meteorological data of the upper atmosphere, accurate weather forecasting is not feasible, and moreover, an accurate prediction of weather and wind patterns such as is required for planning flight routes is not available.

To derive such quantitative data of atmospheric conditions, use has been made of sounding techniques in which an expendable, free-flight balloon carrying sensors and telemetry transmitters is released into the atmosphere. The sensors are carried by the balloon in a unit which is commonly referred to as a radiosonde. These sensors transmit information relating to such significant meteorological data as temperature, pressure and humidity, to a ground-based station at which the information is received and processed. The velocity and direction of the winds in the environment of the radiosonde are commonly obtained by tracking the free-flight paths of the balloon.

In this system, a navigation receiver is placed in the radiosonde which receives navigation signals such as Loran-C and/or Omega signals, and retransmits these signals to the ground. The processing of the returned navigation signals enables the exact balloon position to be determined on an incremental basis, and thus the wind speed and direction may be readily calculated from an observation of the incremental shifts in the position of the radiosonde-carrying balloon.

In an effort to increase the utilization of such devices, it has been proposed to release radiosondes over the oceans and seas and to derive similar data therefrom, so that a world-wide pattern of such meteoralogical data can be obtained. This has presented unique problems which were not faced by ground-based stations, as to achieve the desired completeness of weather coverage, a great number of floating weather stations would be required. One proposed solution to this problem is the provision of a lightweight navigation receiver in the balloon itself. Tracking receivers would be located on merchant ships or the like which commonly travel through the oceans in their normal course, and thus may serve as temporary meteorological stations.

The navigation receiver requires a separate antenna which picks up the navigation signals transmitted to the radiosonde, the radiosonde then preferably amplifying these signals and applying them to the transmitting antenna, which also serves to transmit the sensed meteorological data signals back to the tracking station.

Various attempts have been made to develop a feasible radiosonde system of this type in which a navigation receiver is incorporated to enable the accurate tracking of the radiosonde position. One major problem in this development has been the use of a relatively long receiving antenna which was heretofore thought to be required for use with the navigation receiver. In a typical system, this antenna is in the form of a dipole in which the antenna extends approximately 30 feet above and 30 feet below the radiosonde equipment. The use of such an antenna presents several relatively serious drawbacks in the operation of the radiosonde and balloon, one of which is the difficulty in launching the balloon due to the possible physical interference between the lengthy antenna and the balloon, and another being electrical interference between the lengthy lower portion of the navigation receiver antenna and the transmitting antenna which also commonly extends from the lower portion of the radiosonde. To minimize the latter interference problem, it has been proposed to provide shielding between the navigation receiver and the data transmitting section. This, however, increases the complexity, cost and weight of the radiosonde system and is thus a far from satisfactory solution to the problem of interference. As a result, further developments of radiosonde systems containing a navigation receiver to provide positional and wind velocity information have been limited, and the potential beneficial use of such a system in providing relevant weather data, particularly over bodies of water, has been seriously impeded.

It is thus an object of the present invention to provide, in a radiosonde system of the type described, an improved antenna for use with a navigation receiver carried by that system.

It is a further object of the present invention to provide an improved radiosonde system of the type described in which interference between the navigation and transmitting antennae is significantly reduced and, for all practical purposes, totally prevented.

It is another object of the present invention to provide an improved antenna design for use with a navigation receiver carried in an airborne environment such as in a radiosonde system carried by a lighter-than-air vehicle.

It is a general object of the present invention to provide an improved radiosonde system capable of having its location site accurately determined by the use of a navigation receiver which is reliable in operation, economical in its production, and in which the use of the tracking or navigation receiver does not interfere with the obtaining and transmitting of the desired meteorological data.

In the radiosonde system of the present invention, the required length of the navigation receiver antenna is significantly reduced by producing an artificial ground plane in an airborne system, thereby to permit the use of a significantly shorter antenna. This in turn enables the use of the navigation receiver in a radiosonde system without the problems which commonly attend such a system in which a longer antenna of the type heretofore thought to be required is used.

The antenna of the present invention comprises a relatively short vertical antenna, together with the artificial ground plane formed by a second conductor, to form an antenna with an associated ground system across which the received tracking signal is developed. As the antenna does not require a lengthy lower section as in the prior art antenna, the physical as well as the electrical interference of that lower section with the transmitting antenna is now substantially avoided. The former requirement for shielding the various antennas is thus done away with, and a more economical as well as a more reliable radiosonde system is now provided with the improved antenna design of the present invention.

In one embodiment of the invention, the navigation receiver antenna comprises a relatively short (e.g. 3–12 feet) vertical member, and the artificial ground plane is formed by a pair of intersecting conductors lying in a plane substantially perpendicular to the axis of that vertical conductor being connected to the ground of the navigation receiver. Each of the intersecting conductors is approximately 1-meter in length and is significantly less than one-quarter wavelength of the Loran or Omega navigation signals received at the navigation antenna. Loran signals have typical wavelengths of 10,000 ft., and Omega signals have wavelengths in the order of 100,000 ft. The ground plane conductors may be positioned along a pair of struts which in turn may be secured to the radiosonde container.

In another embodiment of the invention, the ground plane is defined by twisting a second conductor about the short vertical conductor while maintaining sufficient insulation between these conductors. The vertical conductor extends beyond the twisted ground plane conductor by about 9 ft. for Loran signal reception and 21 ft. for Omega signal reception. As before, the ground plane conductor is connected to the receiver and the tracking signal is developed across the two conductors to provide the input to the navigation receiver.

Also disclosed is an improved design of a navigation receiver which is particularly well suited for use with the improved antenna of the present invention, that is, an antenna having an artificial ground plane formed by a second conductor.

To the acomplishment of the above and to such further objects as may hereinafter appear, the present invention relates to an antenna having particular use with a navigation receiver of the type employed in a radiosonde system as defined in the appended claims and as described in the following specification, taken together with the accompanying drawings, in which:

Figure 1:
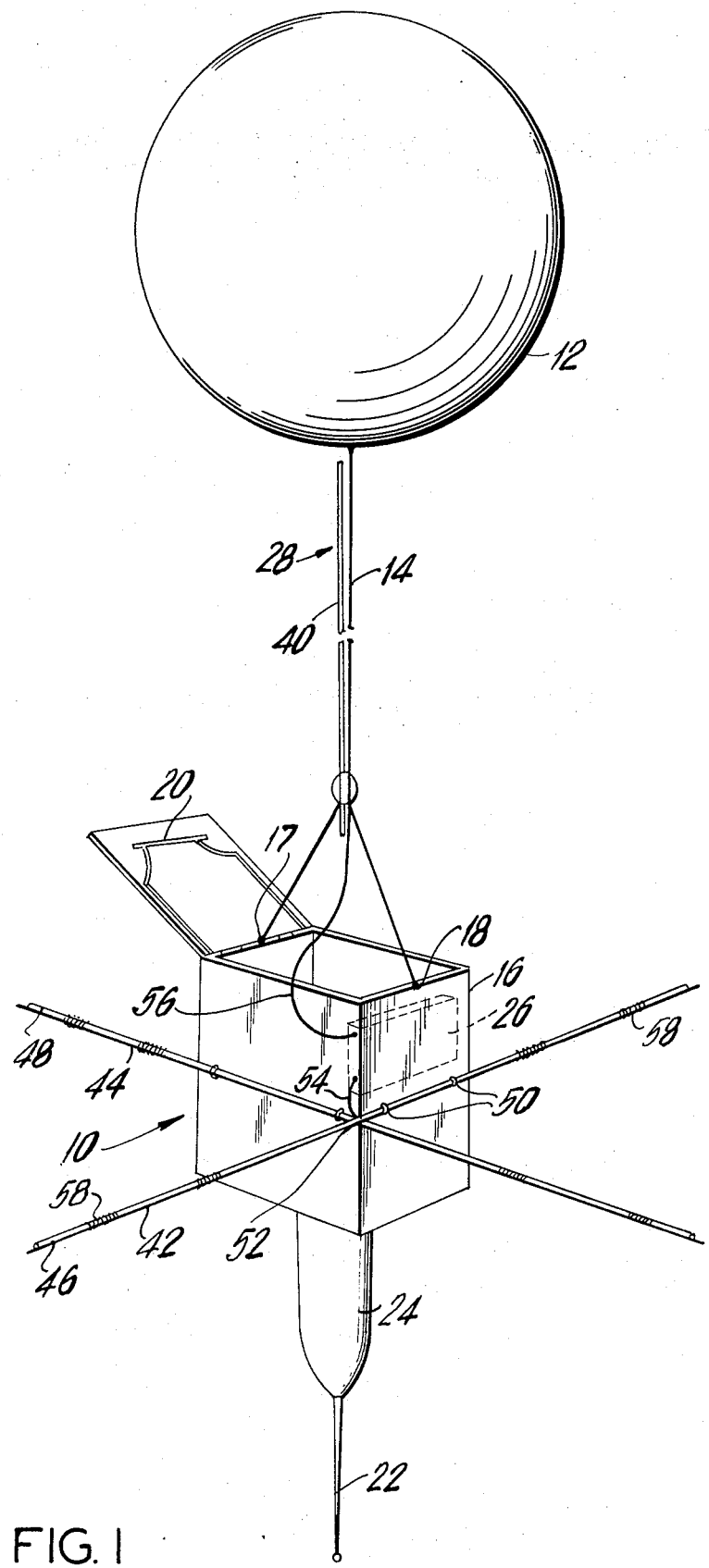
FIG. 1 is a perspective view, somewhat schematic in form, of a radiosonde system which includes a navigation receiver and an antenna therefor, illustrating features of the present invention.

In a typical weather-sensing balloon, as shown in FIG. 1, a radiosonde generally designated 10 is carried aloft by a lighter-than-air balloon 12 which is secured to radiosonde 10 by means of a support here shown as a string 14. Radiosonde 10 comprises a housing 16 to which string 14 is attached at points 17 and 18 in which humidity- and pressure-sensing instruments are carried. These instruments (not shown) are preferably of the type having an electrical parameter, e.g., resistance, which varies in accord with the sensed property, e.g., humidity and pressure. Also contained in radiosonde 10 is a temperature-sensing element 20 which is secured to the upper end of housing 16 and extends outwardly therefrom as shown in FIG. 1. Temperature-sensing element 20 is also preferably of the type having an electrical parameter which varies with the sensed property, here temperature.

In a known manner, the variations in the weather-sensing elements are converted to electrical signals which modulate a carrier wave, which in turn is transmitted to a remote tracking station by an antenna 22 which is secured to and extends from the lower end of a cowling 24 in which the transmitter and modulator circuitry are stored.

In order to permit an accurate determination of the instantaneous position of radiosonde 10 and to detect incremental changes of that position, thereby to provide information regarding wind velocity, a navigation receiver 26 is carried in radiosonde housing 16 and is tuned to receive tracking signals transmitted from the remote tracking station. Navigation receiver 26 is preferably small in size and weight, does not appreciably add to the weight of the radiosonde, and serves to receive at an antenna 28 and then retransmit via antenna 22 a position-tracking signal which is then used to locate the position of the radiosonde system.

Figure 2:
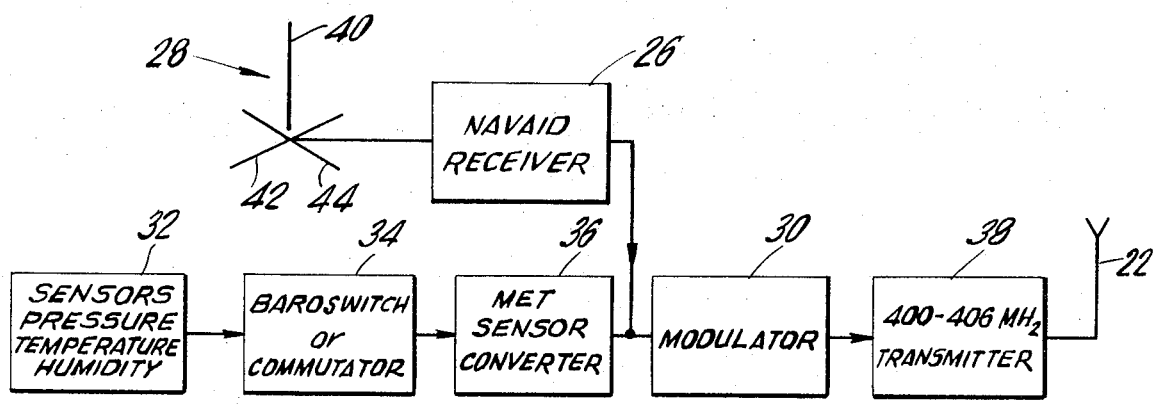
FIG. 2 is a block diagram of the navigation and meteorological receiver and transmitter portion of the radiosonde system of FIG. 1.

FIG. 2 illustrates in block diagram form the radiosonde receiving and transmitting system. Antenna 28 receives the navigation tracking signals, e.g., Loran-C or Omega, and applies them to the input of receiver 26, the output of which is applied to the input of a modulator 30. Block 32 represents the various weather property sensors including the pressure and humidity sensors housed in radiosonde housing 16, as well as temperature-sensing element 20. These sensors provide appropriate electrical signals to the input of a pressure-sensitive pressure control switch or commutator 34. The output of commutator 34 represents the temperature and humidity information which varies at a rate determined by the value of the sensed pressure, and that signal is applied to a sensor-converter 36, which processes this data and applies it to the input of modulator 30. As a result, the navigation signal from receiver 26 and the meteorological data derived from the various sensors each modulate a single carrier which may be in the range of 400 to 406 MHz. That modulated wave carrier is then applied to the output transmitter 38 and the weather and tracking signals are then transmitted to the tracking station from antenna 22.

In the prior art systems of this type, the antenna 28 used in conjunction with the navigation receiver 26 was required to be approximately 60 feet in total length and consisted of two portions, one of which extended 30 feet above and the other of which extended 30 feet below radiosonde housing 16. As described above, the use of an antenna of this type presented a series of problems both in the launch of the radiosonde system and balloon, and in the operation of the transmitter with respect to interference between the navigation signals and the meteorological signals. In accord with the present invention, antenna 28 is designed in a novel and improved manner which serves to eliminate substantially all of the problems associated with the previously used navigation antennas, while providing sufficient signal strength to the navigation receiver to enable it to perform its position-tracking functions for the radiosonde system.

Broadly described, antenna 28 comprises a first conductor, and a second conductor arranged with respect to the first conductor in a manner such as to define an artificial ground plane with respect thereto. The received navigation or tracking signal is developed across the conductor and its respective ground plane, and both conductors are respectively connected to the signal and return inputs of the navigation receiver 26.

The embodiment of antenna 28 shown in FIG. 1, comprises a first conductor 40 which may be in a Loran system between 3 and 12 feet in length and which is here shown attached to string 14 for support. As shown, the upper end of conductor 40 terminates below balloon 12. The artificial ground plane for antenna 28 is defined by a pair of intersecting conductors 42 and 44 which are each about 1 meter in length and which respectively extend along the lengths of struts 46 and 48. Struts 46 and 48 in turn are secured to the side and end walls of radiosonde housing 16 by means such as clips 50. Conductors 42 and 44 intersect and are connected at a point 52 which is connected by a lead 54 to one input of the navigation receiver 26. Conductor 40 is directly connected via lead 56 to a second input of receiver 26.

Conductors 42 and 44 thus lie in a plane which is in proximity to but insulated from conductor 40, thereby to define what may be described as an effective ground plane for conductor 40 which, together with conductor 40 defines an antenna with an associated ground system 28 for navigation receiver 26. The signal developed across conductor 40 and the ground plane defined by conductors 42 and 44 is applied to the input of receiver 26. This construction of antenna 28 thus allows use of a substantially shorter length of conductor 40, which may typically be about 3 and 6 feet in length, without sacrificing the signal strength that is applied to receiver 26 thereby. Since there is no need for a lengthy lower portion of the navigation antenna, there is substantially no interference between that antenna and transmitting antenna 22.

There may be, however, a possibility of adverse effects on transmitting antenna 22 because of the proximity of the latter to the ground plane conductors 42 and 44, which proximity may cause some undesired modification to the polar diagram of antenna 22. To prevent this from occurring or to substantially lessen this effect, a plurality of turns are made in each of conductors 42 and 44 such as at 58. Turns 58 serve to define a plurality of choke coils which effectively divide the ground plane conductors 42 and 44 into small filter sections at the transmitting frequency of antenna 22, e.g. 403 MHz.

Figures 3, 4, 5:
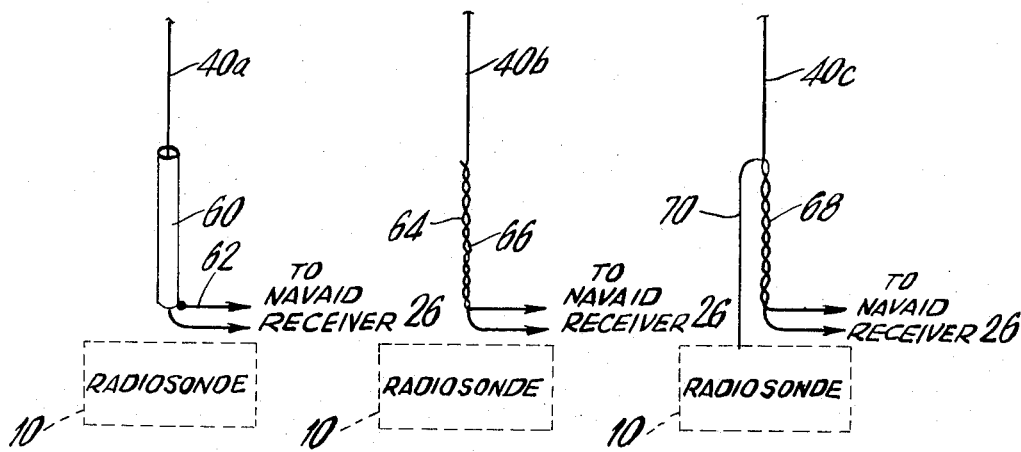
FIG. 3 illustrates a second embodiment of an antenna structure which may be used in the system of FIG. 1.
FIG. 4 illustrates another embodiment of an antenna for use in the system of FIG. 1.
FIG. 5 illustrates yet another antenna for use with the system of FIG. 1.

FIGS. 3, 4 and 5 illustrate other embodiments of an antenna for use in the radiosonde system of FIG. 1 each of which comprises the central or signal-receiving conductor and a second conductor which defines an effective ground plane for that conductor. In FIG. 3, a center conductor 40a has its lower end enclosed by a coaxial sleeve 60 which is insulated and spaced therefrom. A conductor 62 is connected to the lower end of sleeve 60 and that conductor, along with the lower end of conductor 40a, is connected to the respective input terminals of navigation receiver 26.

In the embodiment illustrated in FIG. 4, the lower portion of the signal-receiving conductor 40b has a second conductor 64 of a length of about 3 feet twisted therearound to define a twisted pair 66 of conductors, the ends of which are both applied to the associated input terminals of receiver 26. The twisted, insulated pair 66 of conductors defines an artificial ground plane for the antenna for the purposes described above. The upper end of the conductor 64 of the twisted conductor pair 66 extends in a Loran receiver about 9 feet beyond the upper end of conductor 64 (about 21 feet in an Omega receiver) and is open; that is, it is unconnected either electrically or physically to other parts of the radiosonde system. In a practical, more economical embodiment of the antenna of FIG. 4, the antenna comprises a dual strip of wire in which one of the wire conductors is cut shorter than the other. The latter conductor defines conductor 40b, while the former defines the conductor 64.

In the embodiment of FIG. 5, which is similar to that of FIG. 4, a second conductor 68 is again twisted around the lower portion of a main or central conductor 40c by about 3 feet to define a twisted conductor pair-artificial ground plane. The free end of conductor extends about 9 feet beyond the upper end of conductor 68 in a Loran receiver and about 21 feet beyond the end of conductor 68 in an Omega receiver. Each conductor is connected to the associated input terminal of the navigation receiver 26. However, in contrast to the embodiment of FIG. 4, the upper end of the second twisted conductor 68 is returned to the ground side of the radiosonde housing 16 through a return lead 70.

Figure 6:
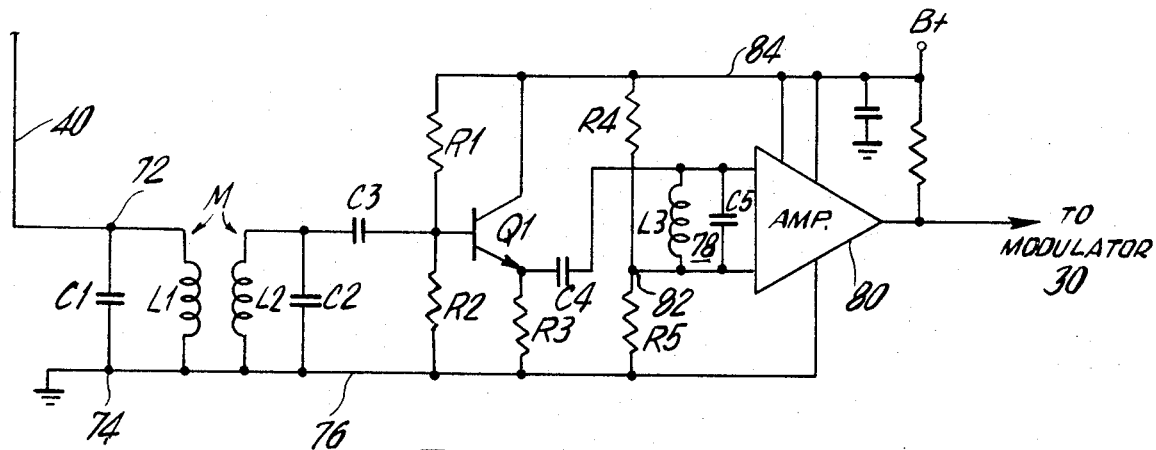
FIG. 6 is a schematic diagram of the navigation receiver of the type which may be used to particular advantage with the antenna structure of the present invention in a radiosonde system.

Because of its relatively short length and because of the additional capacitance between the conductors defining the input antenna for navigation receiver 26, and particularly with respect to the embodiments of FIGS. 4 and 5, the input stage of navigation receiver 26 is preferably specially adapted for optimum reception of the input signal from that antenna. Such a receiver circuit is shown in FIG. 6, in which the central or signal conductor 40 is connected to an input terminal 72 and the ground plane conductor or conductors is connected at an input terminal 74. A capacitor C1 is connected between terminals 72 and 74 and in parallel with an inductor L1. Capacitor C1 along with the associated capacitance of the input antenna 28 defines with inductor L1 an input resonant circuit which is mutually and inductively coupled to a secondary circuit comprised of a capacitor C2 and an inductor L2. Inductors L1 and L2 are preferably of the variable or slug tuned type and are coupled with a mutual coefficient of coupling M.

The secondary tuning circuit is coupled through a capacitor C3 to the base of a transistor Q1 which is connected in grounded-emitter configuration. A suitable bias signal is applied to the base of transistor Q1 through resistors R1 and R2, and the emitter of that transistor is connected to the ground line 76 through a resistor R3. The emitter of transistor Q1 is connected through a capacitor C4 to a resonant circuit 78 which comprises an inductor L3 and a capacitor C5 connected in parallel across the input terminals of an amplifier 80. Resonant circuit 78 has its upper end connected to capacitor C4 and to one input of amplifier 80 and its lower end connected to a point 82 defined at the junction of resistors R4 and R5, which are connected in series bewteen the B+ line 84 and ground line 76.

Resonant circuit 78 is tuned to the navigation frequency, e.g. 100 KHz, and prevents interference at the input of amplifier 80 from the higher, e.g. 403 MHz, signals from transmitter 38.

Transistor Q1 provides the necessary high impedance source for the navigation antenna 28 which permits the efficient coupling of energy from antenna 28 into the receiver since, because of its relatively short length, antenna 28 defines a relatively high impedance at the frequencies of interest. The output of amplifier 80 is thus the amplified navigation signal which in turn is applied to the input of modulator 30.

In a practical application of the radiosonde system of the present invention, the tracking signals transmitted to navigation receiver 26 may be either in the Loran-C or Omega ranges. Receiver 26 may be designed to selectively receive both of these tracking signals, either by designing receiver 26 to have a sufficiently wide bandwidth, e.g., between 10 and 120 KHz, or by providing a switch to selectively operate the receiver at either 13.6 KHz or 100 KHz, depending on which tracking scheme is employed.

The improved navigation antenna of the present invention for use in conjunction with a navigation receiver in an airborne radiosonde system permits the use of that navigation receiver without the difficulties previously found in such systems. Namely, the antenna substantially removes all interference between the navigation and transmitting antenna systems and between the navigation antenna and the balloon. This is done in a relatively inexpensive manner by modifying the design of the navigation antenna to create an artificial ground plane and a resultant antenna with an associated ground system. The effective length of that antenna is considerably shorter than in the previous systems, and its proximity to the transmitting antenna is avoided.

Thus, significantly improved performance of a radiosonde system with respect to position-tracking is achieved without significantly increasing the cost, complexity, and/or weight of the system. As a result, it is not possible to more effectively employ airborne radiosonde systems for use in the determination of the significant upper air parameters.

While only several embodiments of the present invention have been herein disclosed, it will be understood that variations may be made thereto, all within the scope of the present invention.

I claim:

1. In a radiosonde system comprising an airborne carrier, and a receiver in said carrier, an antenna operatively connected to said receiver for receiving navigation signals at a specified wavelength from an external source, said antenna comprising a first conductor, and a second conductor of a physical length considerably less than a quarter-wavelength of said navigation signals twisted about a portion of said first conductor, electrically insulated from said first conductor, and defining an artificial ground plane for said antenna, and means for electrically operatively connecting said first and second conductors to said receiver.

2. The system of claim 1, in which one end of said second conductor is free, said connecting means comprising means for operatively connecting the other end of said second conductor to said receiver.

3. The system of claim 1, in which one end of said second conductor is operatively secured to said carrier, said connecting means comprising means for connecting the other end of said conductor to said receiver.

* * * * *